United States Patent

[11] 3,601,272

| [72] | Inventor | Willard B. Black |
| --- | --- | --- |
| | | Cincinnati, Ohio |
| [21] | Appl. No. | 802,394 |
| [22] | Filed | Feb. 26, 1969 |
| [45] | Patented | Aug. 24, 1971 |
| [73] | Assignee | Phillips Petroleum Company |

[54] FEEDING APPARATUS
2 Claims, 3 Drawing Figs.

[52] U.S. Cl. .................................... 214/730, 214/1 BB
[51] Int. Cl. ........................................ B66f 9/14
[50] Field of Search ........................... 214/730, 1 B, 6 K, DIG. 4

[56] References Cited
UNITED STATES PATENTS

| 1,556,695 | 10/1925 | Kronborg | 214/6 (K) |
| --- | --- | --- | --- |
| 3,063,574 | 11/1962 | Peterson | 214/1 B |
| 3,075,656 | 1/1963 | Pearne | 214/730 X |
| 3,096,896 | 7/1963 | Norton et al. | 214/730 |
| 3,167,201 | 1/1965 | Quayle | 214/730 |
| 3,198,309 | 8/1965 | Ogawa | 214/1 B X |
| 3,241,697 | 3/1966 | Rogant | 214/730 |
| 3,262,594 | 7/1966 | Teago | 214/1 B X |
| 3,437,215 | 4/1969 | Lunden | 214/6 (K) |

*Primary Examiner*—Gerald M. Forlenza
*Assistant Examiner*—Robert J. Spar
*Attorney*—Young and Quigg

ABSTRACT: An article feeding apparatus for automatically depositing articles within the packaging zone of a plastic film packaging machine.

INVENTOR.
W. B. BLACK
BY Young and Quigg
ATTORNEYS

INVENTOR.
W. B. BLACK
BY Young and Quigg
ATTORNEYS

3,601,272

FEEDING APPARATUS

BACKGROUND AND SUMMARY OF THE INVENTION

This invention relates generally to an article feeding system. In one aspect the invention relates to an apparatus for automatically feeding articles to a plastic film packaging machine.

Automatic feeding systems for the conventional plastic film packaging machines are many and varied, their design and function depending primarily upon the nature of the article handled. Gravity feed systems are well known and generally are used to feed relatively small rigid articles such as nuts and bolts. Also a pusher assembly for feeding folded linen or clothing articles is common. These systems generally deposit the article in the packaging zone in more or less a random manner, and therefore are unsatisfactory for handling fragile articles or articles which must be deposited in the packaging zone in a particular attitude. In such systems, the feeding apparatus must maintain a control over the article until it comes to rest on the packaging machine receiving portion. Since the article must be inserted in a relatively small space between the separated film halves of a center fold film, the feeding apparatus must be capable of operating in confined areas. Furthermore, the apparatus must transfer the article in such a manner to avoid damage thereto or disturbance to the packaging film.

It is therefore an object of this invention to provide a plastic film packaging machine with an automatic article feeding apparatus. Another object of this invention is to provide a feeding apparatus which maintains control over the article until it is deposited on the plastic film packaging machine. A further object is to provide an article feeding system which gently transfers the article to the plastic film packaging machine thereby avoiding damage to the article and disturbance to the film.

In achieving these objects, the present invention contemplates the use of a carriage assembly mounted on a traversing bar and provided with controls for programming the movement of the carriage therealong according to a predetermined pattern. Briefly, then, as the article is delivered to the feeding apparatus, the carriage engages the article, transfers it into the packaging zone, and gently deposits it on the receiving portion thereof. The controls program the movement of the carriage so that it traverses a predetermined path in the feed stroke and the return stroke. The configuration of the path is such to avoid abrupt changes in article speed at the beginning and the end of the feed strokes so that the article transfer operation is characterized as gentle.

DRAWINGS

DESCRIPTION OF THE PREFERRED EMBODIMENT

Figure 1:
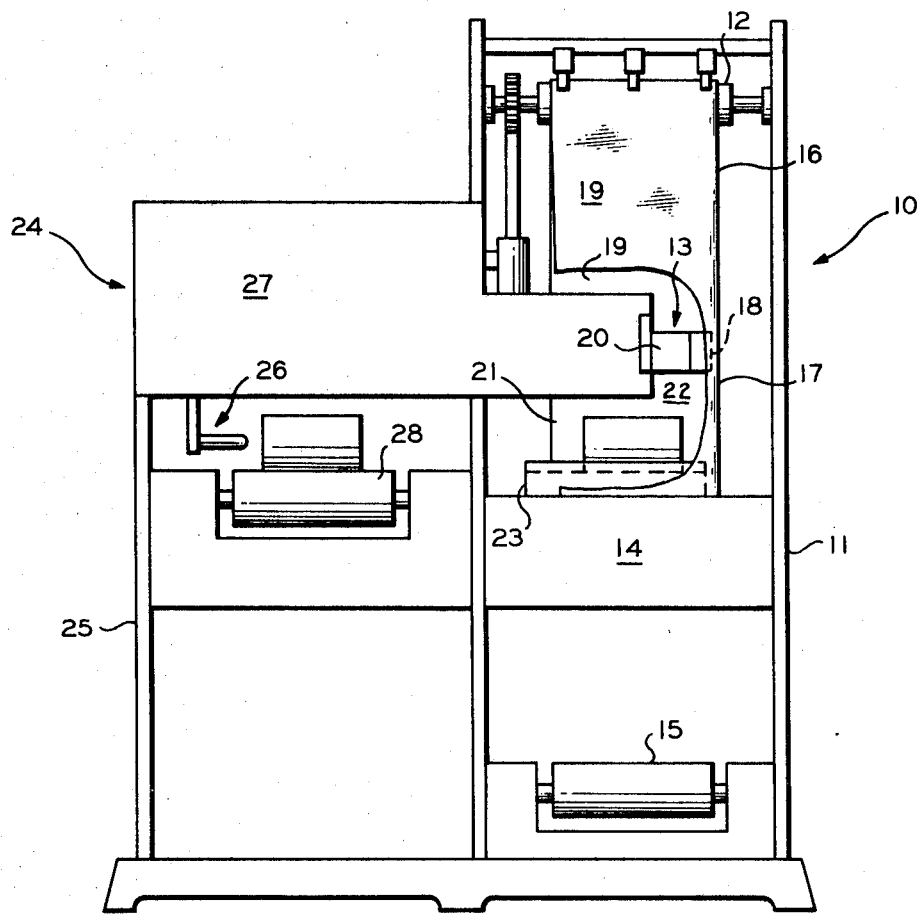
FIG. 1 is a front elevational view of the plastic film packaging machine and its associated feeding apparatus.

With reference to FIG. 1, the plastic film packaging machine 10 is seen to have a main frame 11 which supports the various components including a supply roll (not shown) of open-end, center fold film composed of thermoplastic material such as polyethylene, a driven roller 12, a generally U-shaped spreader device 13, a cutting and heat sealing unit enclosed in housing 14, and a packaged article conveyor 15. In operation, a center fold plastic film 16 is trained over the driven roller 12 and threaded around the spreader device 13 and finally through the cutting and sealing unit in housing 14. In passing the spreader device 13 the medial fold line 17 of film 16 is disposed opposite the base portion 18, and film halves 19,19 are maintained in spaced relation by plate portions 20, leaving a side opening indicated at 21. Thus the space between the spread halves 19,19 constitutes the machine packaging zone 22. The cutting and sealing unit includes a pair of diverging guides, one shown as 23, which serve to support the article delivered to zone 22. An article disposed in the packaging zone 22 is indexed to a position below the cutting and sealing unit which operates to completely seal and sever the packaged article from the supply film 16. The packaged article is then discharged onto conveyor 15 which removes it from the machine 10. The film packaging machine 10 has been described only generally to set the environment for the present invention. A more detailed description of a film packaging machine operable with the feeding system contemplated by this invention is presented in U.S. Pat. No. 3,209,513, issued to R. H. Cochrane, and dated Oct. 5, 1965.

The purpose of the present invention is to provide a feeding apparatus, 24, for automatically delivering articles to the packaging zone 22 of machine 10. The apparatus 24 includes a frame 25 on which is mounted a carriage assembly 26 enclosed in housing 27 (FIG. 1), and a feed conveyor 28 for intermittently delivering articles to the carriage assembly 26.

Figure 2:
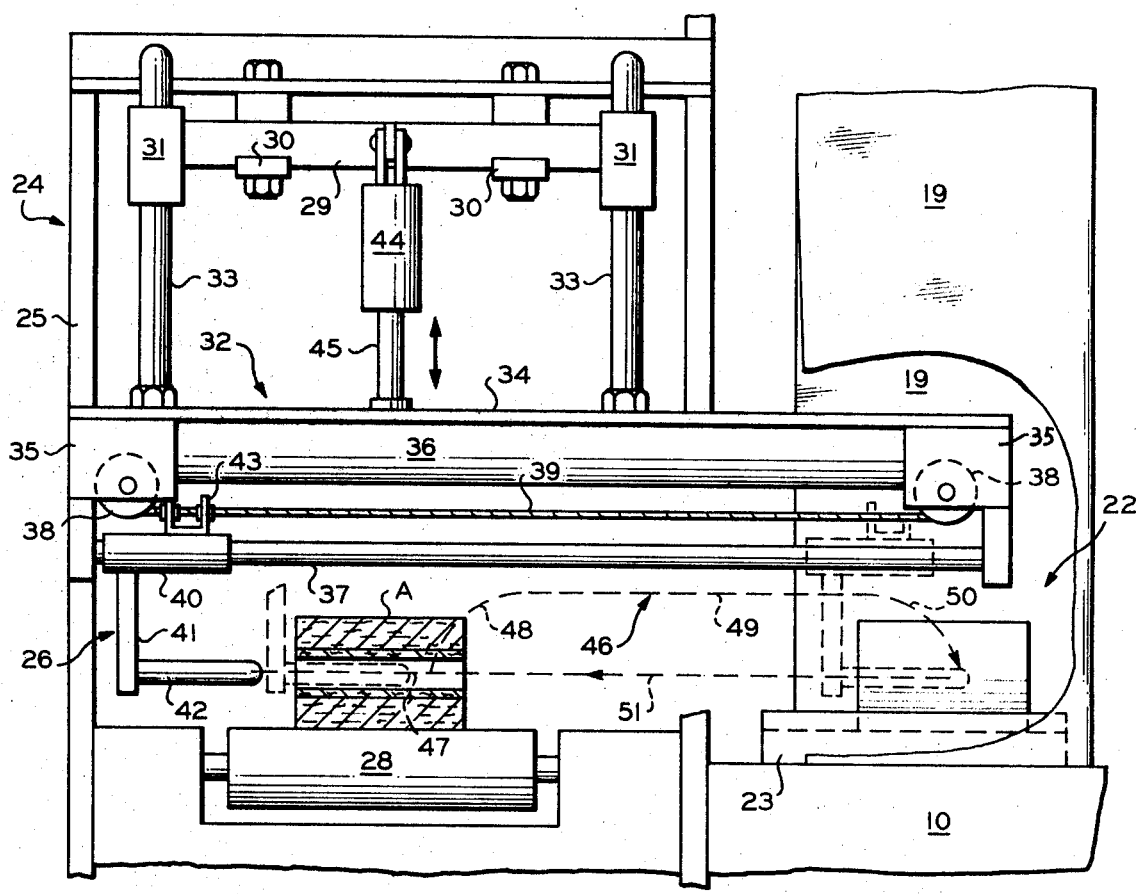
FIG. 2 is an enlarged elevational view of the feeding apparatus with portions cut away for convenience of illustration.

As shown in detail in FIG. 2, the carriage assembly comprises a stationary portion 29 secured to the main frame 25 by means of a pair of spaced clamping and bracket assemblies 30, and a frame structure 32 slidably mounted on the stationary portion 29. The stationary portion 29 includes a pair of sleeves 31,31 for slidably receiving guide rods 33 of the frame structure 32. The guide rods 33 are bolted to a cross bar 34 having end brackets 35,35 arranged in confronting relation. The brackets 35,35 support in parallel relation a double-acting cable cylinder 36 and a traversing rod 37. Journaled to the brackets 35, 35 and disposed at opposite ends of cylinder 36 are pulleys 38,38 around which is trained the cylinder cable 39. A sleeve 40 slidably mounted on the traversing rod 37 has depending therefrom a member 41 which carries a horizontal pin 42. The sleeve 40 is connected to the cable run by means of a U-shaped bracket 43. Thus when air flow is directed into one end of cylinder 36 driving its internal piston in one direction, the assembly comprising sleeve 40, member 41, and pin 42 are driven in the opposite direction along traversing bar 37. Air flow to the opposite end of cylinder 36 reverses the direction of the assembly.

A vertically disposed cylinder 44 anchored to the stationary portion 29 has a piston rod 45 connected to the cross bar 34 and provides the means for moving the movable frame structure 32 vertically in relation to the stationary portion 29, it being understood that the guide rods 33,33 maintain the two assemblies in proper alignment.

In the preferred embodiment of this invention, the carriage assembly 26 operates to sequentially pick up, transfer, and deposit a cylindrical article A into the packaging zone 22 of the packaging machine 10. However, it should be observed that the particular configuration of the article engaging means, e.g., member 41 and pin 42, in this embodiment, may be varied according to the nature of the article to be packaged. For example, if the article were a solid cylinder, the article engaging means could take the form of a saddle adapted to engage the periphery of the article at circumferentially spaced points. Still further, if the article to be packaged were fragile glass articles such as lamp globes, the article engaging means could take the form of a vacuum pickup head. However, for purposes of illustration, the article to be packaged in this preferred embodiment is rolls of copying paper carried on a central hollow core, thus making the pin 42 an appropriate article engaging member.

Suitable controls for the cylinders 36 and 44 are provided so that the article engaging members (pin 42 and member 41) traverse a path indicated by arrow 46.

Electropneumatic controls are provided so that the article engaging means comprising member 41 and pin 42 traces a curvilinear path in the delivery stroke. The pattern of the path is illustrated in FIG. 2. At the beginning of the delivery stroke, the pin 42 travels rectilinearly into the core of the article A.

Before the pin 42 is completely inserted in the core, cylinder 44 is actuated elevating the movable frame structure 32 which carries the article engaging members 41 and 42. Thus, the members 41 and 42 are moved simultaneously horizontally and vertically tracing a curvilinear path indicated at 48. Just before the member 42 reaches the maximum elevation, the pin 42 engages the inner surface of the core of article A, lifting it off the conveyor 28. Now when piston rod 45 is fully retracted into cylinder 44, continued movement of the member 41 by the cable cylinder 36 moves the pin 42 and the article A carried thereby in a rectilinear direction indicated by path portion 49. As the article A and member 41 approach the packaging zone 22 of the machine 10, the cylinder 44 is again actuated lowering the carriage assembly 26 and causing the pin 42 and article A to again move in a curvilinear path indicated by 50. The cylinders 36 and 44 are timed so that the former reaches its full stroke slightly before the latter. The timing is also set so that the pin 42 disengages from the article A at or near the full stroke of the cable cylinder piston. Thus the final movement of the pin 42 will be vertical. Finally, the article engaging member 41 is retracted through a rectilinear return stroke 51 returning it to its home position and placing the system in a condition for a successive article. Thus it will be appreciated that the simultaneous action of the cylinders 36 and 44 provides for a smooth and gentle transfer of the article from the conveyor 28 to the packaging zone 22.

Figure 3:
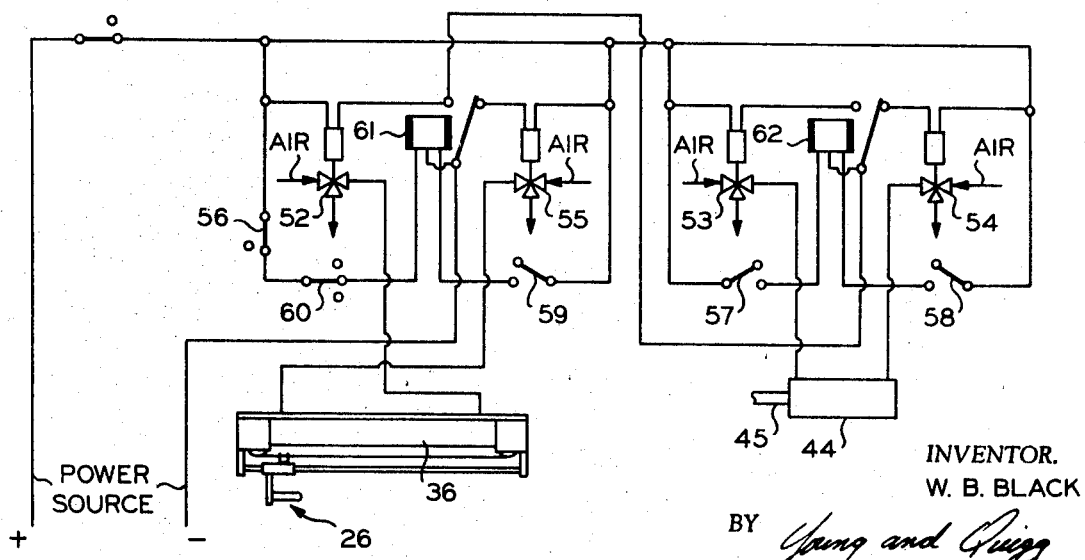
FIG. 3 is a diagrammatic presentation of the control system used in the feeding apparatus of FIG. 2.

While a variety of controls may be used to drive the article engaging member 41 through the path described, this preferred embodiment shows but one (see FIG. 3). The pneumatic system for actuating the cylinders 36 and 44 includes solenoid actuated valves 52, 53, 54 and 55 operatively responsive to electrical limit switches 56, 57, 58 and 59, respectively. The electrical system also includes limit switch 60, and latching relays 61 and 62. More specifically, the piston of cable cylinder 36 is driven through the delivery stroke by actuation of valve 52 connected in circuit with switch 56 which is disposed for tripping by the article A conveyed on conveyor 28. When the article engaging member 41 is in the home position, it closes switch 60 so that when article engages switch 56 the circuit to a latching relay 61 is completed. Actuation of the relay 61 closes the electrical circuit to the solenoid of valve 52 directing air flow to the cylinder 36 which drives the article engaging member 41 through the rectilinear portion 47 of path 46 (see FIG. 2).

The piston of cylinder 44 is driven through the lifting stroke by actuation of solenoid valve 53 which is connected in circuit with limit switch 57. The limit switch 57 is disposed in the path of sleeve 40 and is so positioned that when the pin 42 has sufficiently entered the core of the article, switch 57 is actuated closing the circuit to a latching relay 62 which in turn closes the circuit to the solenoid of valve 53. This directs air flow to the rod end of cylinder 44 and in combination with the cable cylinder 36 drives the article engaging member 41 in the curvilinear portion 48 of path 46.

The piston of cylinder 44 is driven through the lowering stroke by solenoid valve 54 connected in circuit with the limit switch 58. Limit switch 58 disposed in the path of sleeve 40 is tripped thereby completing the circuit to the latching relay 62, the actuation of which breaks the circuit to solenoid valve 53 and completes the circuit to solenoid valve 54. Air flow is directed to the head end of cylinder 44 which in combination with the cylinder 36 drives the article engaging member 41 and the article carried thereby in the curvilinear portion 50 of path 46. Now when the article engaging member 41 has reached its full stroke along traversing bar 37 the final incremental downward movement of the carriage assembly 26 causes the sleeve 40 to trip limit switch 59 completing the circuit to the latching relay 61 which in turn completes the circuit to the solenoid of valve 55. This directs air flow to the opposite end of cylinder 36 driving the piston disposed therein in the return stroke (curve portion 51). In reaching its home position, the sleeve 40 trips the limit switch 60 placing the system in condition for a successive article.

While the preferred embodiment of this invention has been described in particular detail, it should be understood that modifications and alterations may be made therein without departing from the scope and spirit of the invention as set forth in the appended claims.

That which I claim is:

1. An apparatus for depositing articles having an opening extending therethrough on a receiving portion within a packaging zone of a packaging machine, said apparatus comprising:

a frame positioned adjacent the packaging zone;

a feed conveyor connected to the frame and being intermittently movable for intermittently delivering articles to a first location at which the article is adjacent the receiving portion of the packaging zone of the packaging machine with the opening of the article axially aligned in one direction toward said receiving portion of the packaging machine;

a carriage assembly attached to the frame having a horizontal extending pin and being intermittently movable in a horizontal and vertical direction between a first position at which the pin is spaced from the receiving portion of the packaging machine and an intervening article on the feed conveyor axially aligned with the opening of said article and a second position at which the pin is positioned above the receiving portion of the packaging machine spaced a distance upwardly therefrom;

a vertically disposed hydraulic cylinder having a vertically movable piston rod and being connected to the frame adjacent and at a higher elevation than the feed conveyor and the receiving portion of the packaging machine;

a horizontally disposed double-acting cable cylinder connected between the piston of the vertically disposed cylinder and the carriage assembly, said cable cylinder being positioned adjacent and at a higher elevation than the feed conveyor and the receiving portion of the packaging machine and vertically movable by the vertically disposed cylinder;

means connected to the cable cylinder and the carriage assembly for horizontally moving the carriage assembly and associated pin; and controlling means for energizing and deenergizing the vertically disposed cylinder and the horizontally disposed cable cylinder for intermittently moving the pin of the carriage assembly in a predetermined path from the first position in only a horizontal direction to a position at which a portion of the pin is within the opening of the article, thereafter moving the pin simultaneously horizontally and vertically upwardly in a continuous smooth path for contacting and moving the article upwardly and toward the receiving portion of the packaging machine, thereafter moving the pin and associated article only horizontally toward the packaging zone, thereafter moving the pin and associated article simultaneously horizontally and vertically downwardly in a continuous smooth path for depositing the article on the receiving portion of the packaging machine, thereafter moving the pin in only a vertical direction downwardly for removing the pin from contact with the article, and thereafter moving the pin in only a horizontal direction to the first position of the pin, the attitude of the article being the same throughout the movement of the pin from the first to the second position.

2. An apparatus, as set forth in claim 1, wherein the frame comprises a first stationary frame element and a second movable frame element slidably mounted on the stationary frame element.